(12) United States Patent
Muck et al.

(10) Patent No.: US 9,126,516 B2
(45) Date of Patent: Sep. 8, 2015

(54) SYMMETRICALLY DESIGNED OUTER SIDE MEMBER FOR A SEAT

(75) Inventors: Todd Rupert Muck, Fowlerville, MI (US); Masroor Fahim, Canton, MI (US); Peter James Moegling, Brighton, MI (US); Robert Joseph Hazlewood, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 588 days.

(21) Appl. No.: 13/531,158

(22) Filed: Jun. 22, 2012

(65) Prior Publication Data

US 2013/0341990 A1 Dec. 26, 2013

(51) Int. Cl.
*A47C 7/02* (2006.01)
*B60N 2/68* (2006.01)

(52) U.S. Cl.
CPC . *B60N 2/68* (2013.01); *B60N 2/688* (2013.01)

(58) Field of Classification Search
CPC .................................. B60N 2/68; B60N 2/682
USPC .................................................... 297/452.18
See application file for complete search history.

(56) References Cited

U.S. PATENT DOCUMENTS

| 5,050,932 | A | * | 9/1991 | Pipon et al. | 297/354.12 |
| 5,897,168 | A | * | 4/1999 | Bartelt et al. | 297/452.18 |
| 6,752,465 | B2 | * | 6/2004 | Igarashi | 297/452.18 |
| 2004/0040229 | A1 | | 3/2004 | Torch | |
| 2011/0006571 | A1 | * | 1/2011 | Imaoka | 297/232 |
| 2012/0038199 | A1 | * | 2/2012 | Matsumoto et al. | 297/452.18 |

FOREIGN PATENT DOCUMENTS

| CN | 102307751 A | | 1/2012 |
| EP | 2199158 A1 | | 6/2010 |
| GB | 2262882 A | | 7/1993 |
| JP | 3186085 | * | 7/2001 |
| JP | 2006-36101 | | 2/2006 |
| JP | 2011131698 A | | 7/2011 |

* cited by examiner

*Primary Examiner* — Matthew Ing
(74) *Attorney, Agent, or Firm* — Gifford, Krass, Sprinkle, Anderson & Citkowski, P.C.

(57) ABSTRACT

A seat frame structure having frame components that are symmetrical about a longitudinal center line is provided. The seat frame components can be symmetrical about a longitudinal center line and thereby enable the component to be rotated about the center line so it may be used on a right side or a left side of the seat with all structural and/or functionality preserved. Some structural and/or functional features of the seat component that are carried over from a right side to a left side, and vise versa, when the seat component is symmetrical include but are not limited to recliner attachment holes, cable attachment holes, crossbar attachment holes, an airbag slot, flanges, and backboard attachment holes, etc.

13 Claims, 4 Drawing Sheets

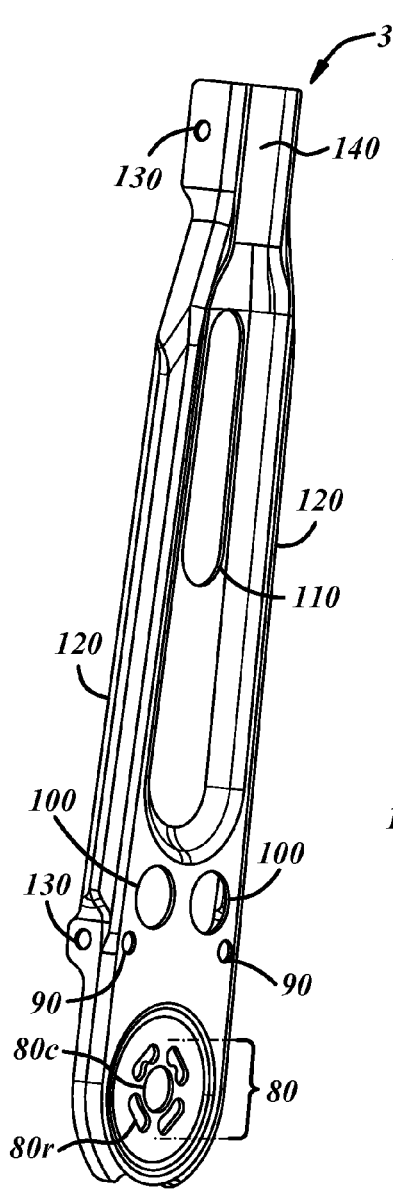 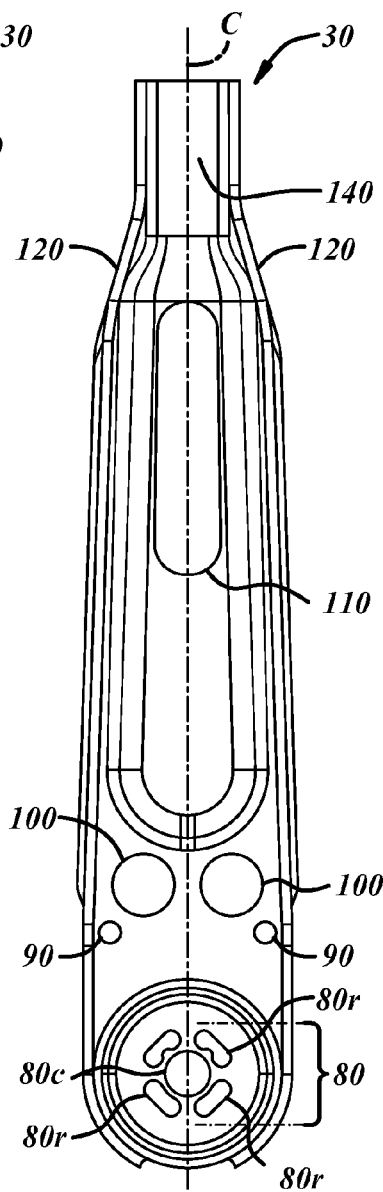 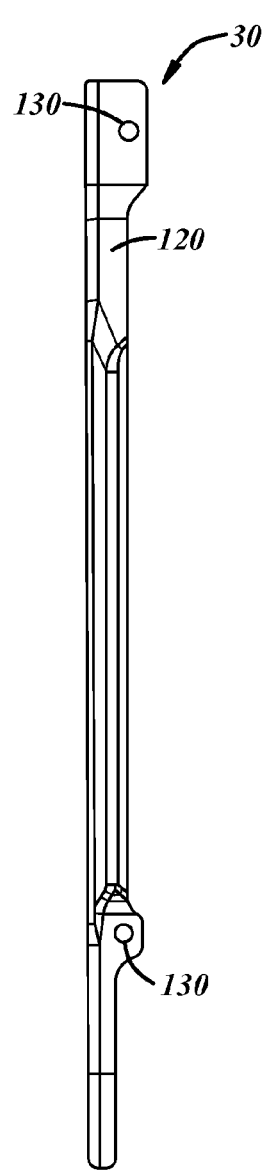
FIG. 2  FIG. 3  FIG. 4
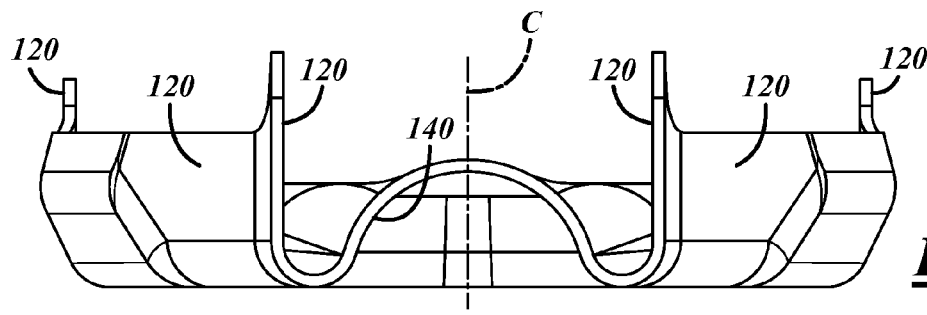
FIG. 5

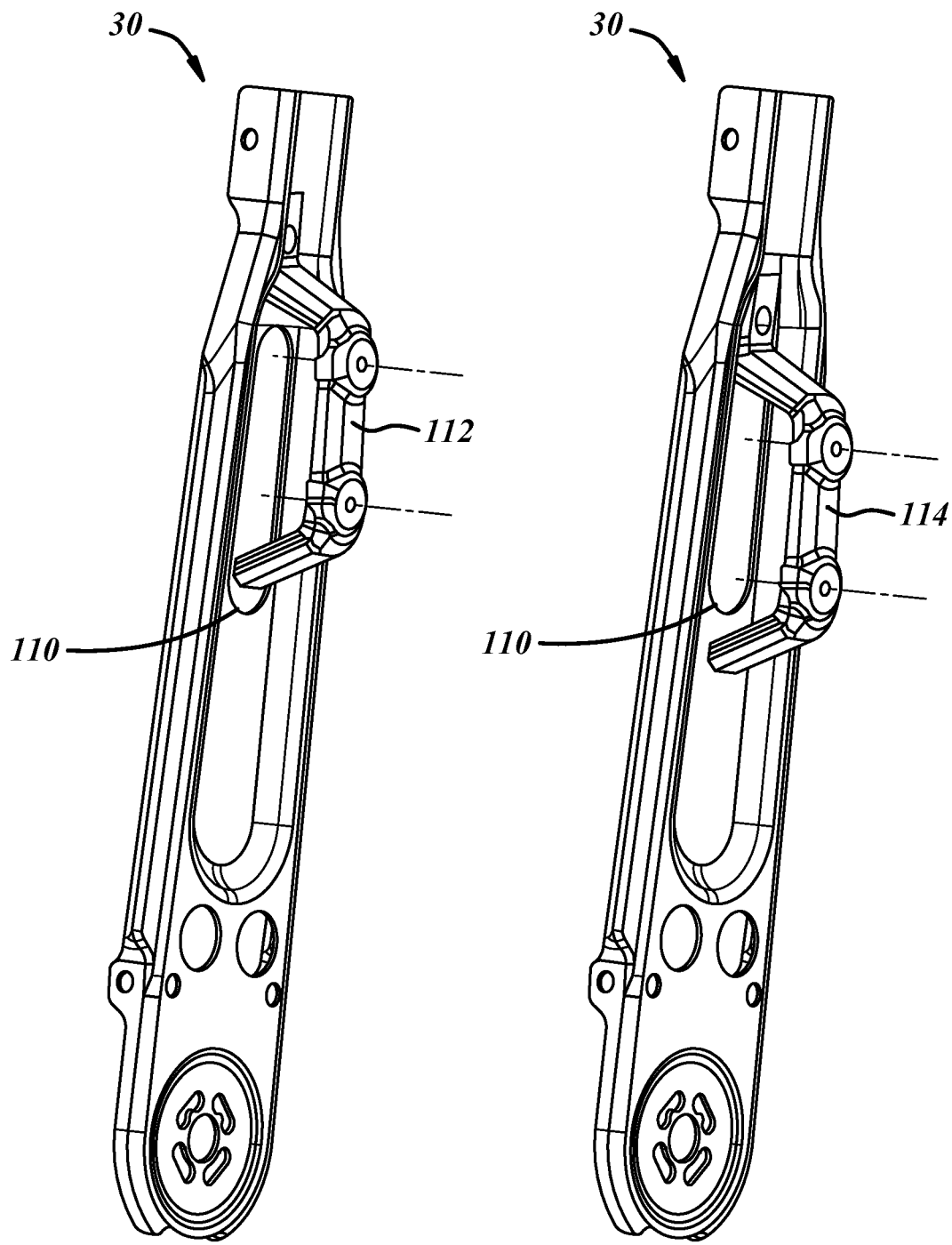
*FIG. 6*  *FIG. 7*

SYMMETRICALLY DESIGNED OUTER SIDE MEMBER FOR A SEAT

FIELD OF THE INVENTION

The present invention is related to a seat, and in particular to a motor vehicle seat having a symmetric back post.

BACKGROUND OF THE INVENTION

Automotive seats are known to be constructed using manufacturing methods that supply an underlying frame structure which supports a seat suspension, cushions, fabric, and the like. This underlying frame structure is often made of metal component parts which are bolted, welded, or otherwise attached together using methods known to those skilled in the art. The frame structure can be that of a traditional seat or it can be that of a 60/40 split seat wherein one seat, such as the driver's seat, is a traditional seat and another seat, such as the passenger seat, includes a seating portion and a center portion.

It is appreciated that the frame structure is made of many different frame component parts. These component parts are often specially designed depending on such variables as which side of the seat the component is to be installed on, which variant of the seat is to be used, and the such. In addition, this high number of different components increases the cost of manufacturing a seat for an automobile. Therefore, there is a need to reduce the number of different parts in a seat frame structure to help reduce the overall cost of manufacturing the automotive seat.

SUMMARY OF THE INVENTION

A seat frame structure of the present invention includes frame components that are symmetrical about a longitudinal center line. Being symmetrical about a longitudinal center line enables the seat frame component to be rotated about said center line so it may be used on a right side or a left side of the seat with all structural and/or functionality preserved. Some structural and/or functional features of the seat component that are carried over from a right side to a left side, and vise versa, when the seat component is symmetrical include but are not limited to recliner attachment holes, cable attachment holes, crossbar attachment holes, an airbag slot, flanges, and backboard attachment holes, etc. The seat frame component which is symmetrical about a longitudinal axis can be used in a traditional seat, in a 60/40 split type seat, or in other seating configurations known to those skilled in the art

BRIEF DESCRIPTION OF THE DRAWINGS

FIG. 2 shows a perspective view of an outer side member;

FIG. 3 shows a side view of an outer side member symmetrical about a center line;

FIG. 4 shows an alternate side view of an outer side member;

FIG. 5 shows a top view of an outer side member symmetrical about a center line;

FIG. 6 shows a perspective view of an outer side member with an airbag attachment in a top position;

FIG. 7 shows a perspective view of an outer side member with an airbag attachment in a bottom position.

DETAILED DESCRIPTION OF THE INVENTION

The invention involves a side member for a seat frame. The side member, and some if not all its features can be symmetrical about a longitudinal centerline of the side member. The possible features include, but are not limited to crossbar attachment holes, recliner attachment holes, backboard attachment holes, an airbag attachment slot, etc. A symmetrical side member enables the same side member to be used on either a right side or a left side of the seat frame. This reduces the number of different parts on the seat frame, thereby reducing production costs, simplifying manufacture of a seat and the like.

Figure 1:
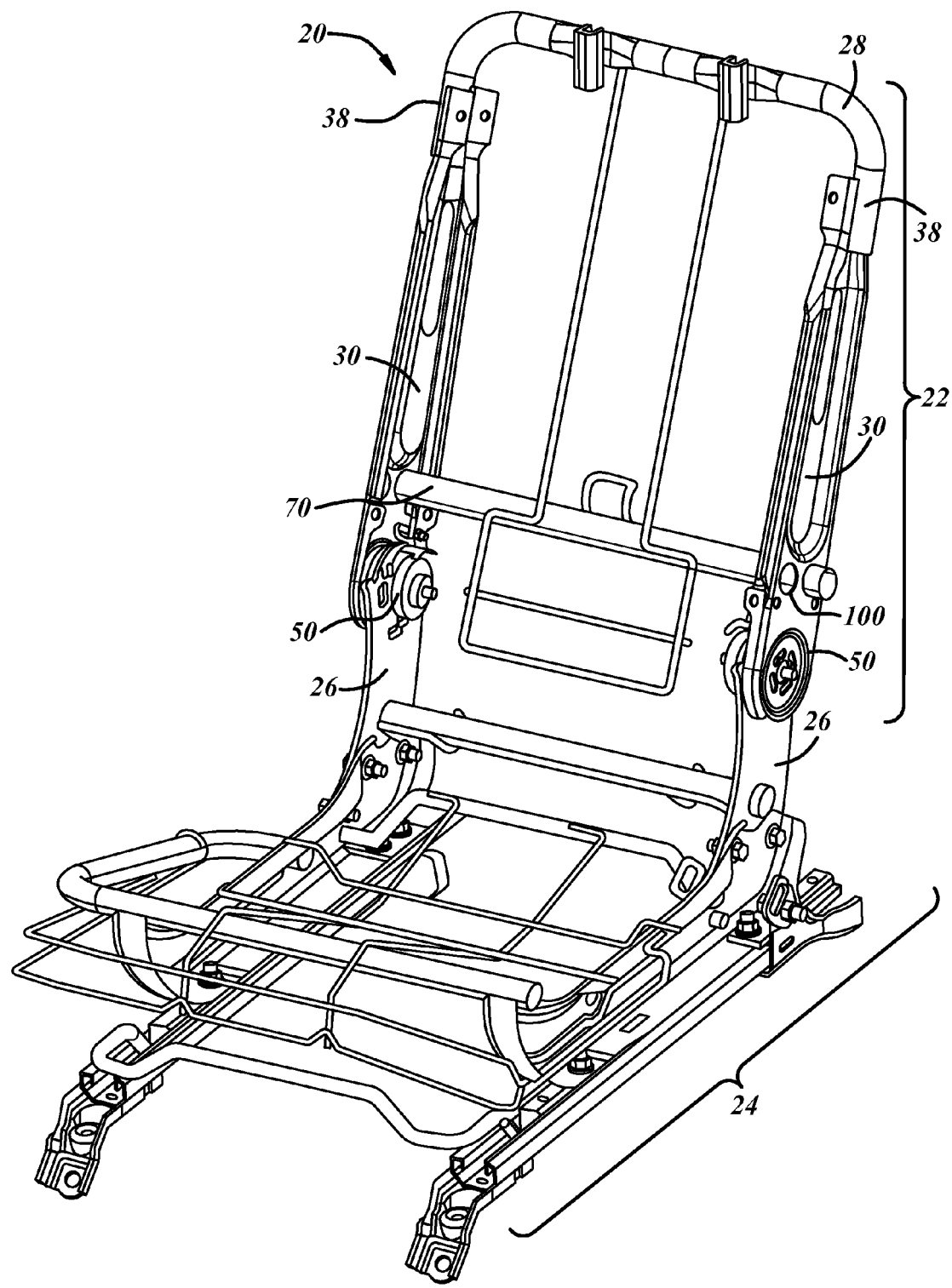
FIG. 1 shows a perspective view of a seat frame containing an embodiment of the present invention.

FIG. 1 shows a seat frame 20 of the preferred embodiment. The seat frame has a sitting portion 24 and a back portion 22. The sitting portion 24 is attached to the back portion 22 at a recliner 50. The recliner 50 joins a bottom member 26 on the sitting portion 24 to an outer side member 30 on the back portion 22.

It is appreciated from FIG. 1 that there can be a pair of outer side members 30. The shown outer side members 30 are symmetrical about a longitudinal center line C and can be used on either the right side or the left side of the seat frame 20 without losing any structural and/or functional features, the right side defined as the right hand side of seat frame 20 when viewing FIG. 1 and the left side defined as the left hand side of seat frame 20 when viewing FIG. 1. The outer side members 30, located on a left and right side of seat frame 20, can be joined by a crossbar 70 and by an upper pipe 28.

The details and features of the outer side member 30 of the preferred embodiment can be better seen in FIGS. 2-5 with the outer side member 30 symmetrical about a longitudinal centerline C. It is appreciated from the figures that the functional features of the outer side member 30 are mirrored about the centerline C, and as such, enable the outer side member 30 to be used on either the right side or the left side of the seat frame by translating the outer side member 30 from one side to the other, and rotating the outer side member 30 180 degrees about the longitudinal centerline C.

The outer side member 30 of the preferred embodiment can include a pair of crossbar attachment holes 100 located on opposite sides of the longitudinal centerline C. The crossbar 70 is installed into one of the crossbar attachment holes 100 leaving the other hole unused. The attachment of the crossbar 70 to the outer side member 30 can be performed by welding, threaded fasteners, or any other method known to those skilled in the art. In addition, the crossbar attachment holes 100 are offset from the centerline C so that the cross bar 70 may be attached to or at a rear crossbar attachment hole 100 and thereby allowing space in front of the crossbar 70 for the seat suspension, padding, etc. Furthermore, the unused crossbar attachment hole 100 can be used when the outer side member 30 is translated and rotated to be used on the other or opposite side of seat frame 20. It is appreciated that the crossbar attachment holes 100 can be symmetrical about the longitudinal centerline C of the outer side member 30.

The outer side member 30 can also include a plurality of recliner attachment holes 80 for attaching the recliner 50. The plurality of recliner attachment holes 80 includes a center hole 80c and multiple radial holes 80r spaced apart from the center hole 80c. The crossbar attachment holes 100 are located further from the center hole 80c than the radial holes 80r. In addition, the recliner attachment holes 80 can be symmetrical about the centerline C so as to enable the outer side member 30 to be functional with the recliner 50 attached on the right side or the left side of seat frame 20. As exemplified by the preferred embodiment, the plurality of recliner attachment holes 80 for attaching the recliner 50 can be non-circular, i.e.: any shape that will facilitate attachment of the recliner 50 so long as the plurality of recliner attachment holes 80 are symmetrical about the longitudinal centerline C of the outer side member 30.

The outer side member 30 can also include a plurality of cable attachment holes 90. The cable attachment holes 90 allow routing of control cables (not shown) for control of the recliner 50. It is appreciated that the cable attachment holes 90 can be symmetrical about the longitudinal centerline C of the outer side member 30.

The outer side member 30 can further include a pair of flanges 120 which extend generally perpendicular to, along, or from the edges of the outer side member 30. The flanges 120 add rigidity and support to the outer side member 30, thereby helping to protect an occupant in a crash, as well as increasing the overall strength and durability of the seat frame 20. The flanges 120 may also include a plurality of backboard attachment holes 130 to allow for the attachment of a backboard (not shown) on the rear of the seat frame 20. The backboard can be made of plastic, wood, cardboard or any other material known to those skilled in the art. The flanges 120 and the backboard attachment holes 130 can be symmetrical about the longitudinal centerline C of the outer side member 30.

The top of the outer side member 30 can have an upper pipe attachment portion 140 designed to receive the upper pipe 28 as shown in FIG. 1. It is appreciated that by using various designs of upper pipe 28, such as different lengths of a vertical portion 38, different heights of the back portion 22 on the seat frame 20 can be achieved while utilizing the same outer side member 30. The upper pipe 28 can be made with a length of the vertical portion 38 long enough to accommodate the tallest back portion 22 required, the vertical portion 38 then being cut to a shorter length for shorter back portions 22. In the alternative, the vertical portion 38 can be located at different positions within the attachment portion 140 in order to provide different heights for the back portion 22. The attachment portion 140 can have a complimentary, similar and/or generally identical contour to the adjoining surface on the vertical portion 38 of the upper pipe 28. In the shown preferred embodiment, both the attachment portion 140 and the vertical portion 38 are arcuate in shape, e.g. circular. The outer side member 30 can be attached to the upper pipe 28, using any attachment means known to those skilled in the art, e.g. welding, threaded fasteners, etc. In addition, the attachment portion 140 can be symmetrical about the longitudinal centerline C of the outer side member 30.

Turning now to the FIGS. 6 and 7, the outer side member 30 can further include an airbag attachment slot 110 that facilitates the attachment of a side airbag. For example, the airbag attachment bracket can be located in a top position 112, in a bottom position 114, or any location in between. As such, the airbag attachment slot 110 allows the outer side member 30 to be used in multiple automotive models, locations, etc. by enabling varied positioning of the side airbags without the need for a seat frame component manufactured and designed to accommodate a specific airbag attachment location. It is appreciated that the airbag attachment slot 110 can be symmetrical about the longitudinal centerline C of the outer side member 30.

Figure 8:
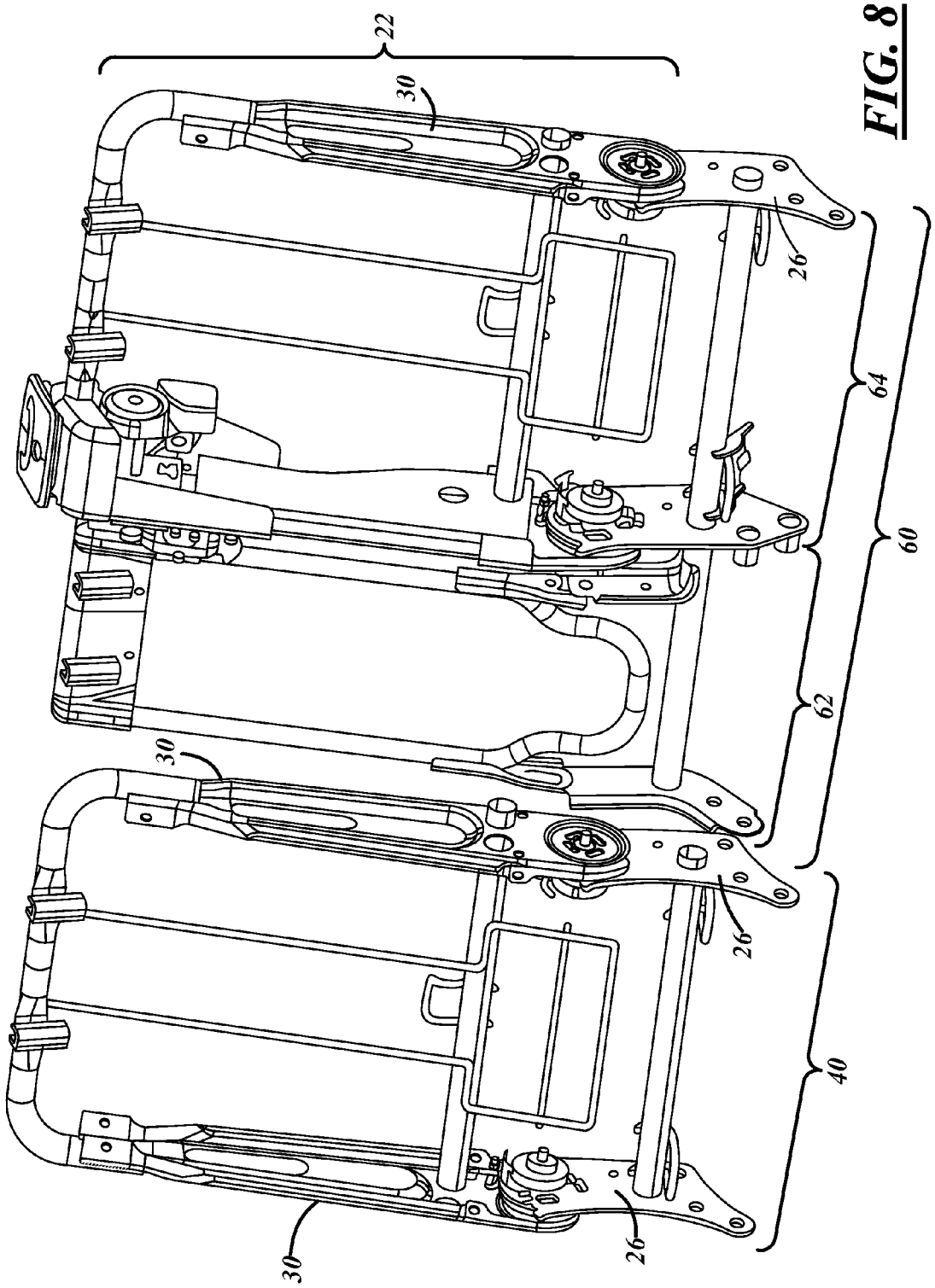
FIG. 8 shows a seat frame section of a 60/40 split style seat.

The outer side member 30 can be used in a traditional seat as shown in the FIG. 1, and can also be used in a 60/40 split style seat as shown in FIG. 8. FIG. 8 shows the back portion 22 of a 60/40 split style seat attached to a plurality of bottom members 26. A 60/40 spilt style seat includes a narrow portion 40 and a wide portion 60. The narrow portion 40 is similar to the traditional seat frame 20 as shown in FIG. 1 while the wide portion 60 includes a side seat portion 64 and a center seat portion 62. In a 60/40 split style seat, the outer side member 30 can be used on the narrow portion 40, and on the side seat portion 64 of the wide portion 60.

In the preferred embodiment, the outer side member 30 is made of steel and manufactured using a metal stamping process. The various holes and features can be preformed, punched, drilled, milled, or otherwise machined using various methods known to those skilled in the art. In addition, it is understood and appreciated that the outer side member 30 can be made of various materials and methods known by those skilled in the art without deviating from the spirit of the invention. As such, the foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the claims, including all equivalents, which define the scope of the invention.

We claim:

1. A seat support structure comprising:
   an outer side member having a centerline, a series of recliner attachment holes including a center hole and plurality of radial holes spaced apart from the center hole, and a pair of crossbar attachment holes located on opposite sides of and offset from the center line, the crossbar attachment holes located further from the center hole than the radial holes;
   the outer side member being symmetrical about the center line, and symmetrically dimensioned such that the outer side member can be used on either a right side or a left side of the seat support structure.

2. The seat support structure of claim 1, wherein the outer side member includes one or more cable attachment holes.

3. The seat support structure of claim 1, wherein the outer side member includes a slot for attaching a side airbag.

4. The seat support structure of claim 3, wherein the slot can accommodate attachment of the side airbag in a plurality of positions.

5. The seat support structure of claim 1, wherein the outer side member includes an upper pipe attachment portion.

6. The seat support structure of claim 1, wherein the outer side member includes a pair of flange portions.

7. The seat support structure of claim 6, wherein the pair of flange portions includes one or more backboard attachment holes.

8. The seat support structure of claim 1, wherein the outer side member is manufactured by a metal stamping process.

9. The seat support structure of claim 1, wherein the seat support structure is an automotive seat support structure.

10. A motor vehicle seat comprising:
   a sitting portion and a back portion, said back portion having a right outer side member and a left outer side member with a back crossbar member attached to and extending therebetween;
   said right and left outer side members each having a longitudinal centerline and a pair of crossbar attachment holes offset from and located on opposite sides of the center line, the right and left outer side members being symmetrical about said centerline such that said right outer side member can be used as said left outer side member and said left outer side member can be used as said right outer side member with said back crossbar member directly attached to one of the pair of crossbar attachment holes.

11. The motor vehicle seat of claim 10, wherein said sitting portion and said back portion are connected by a reclining device, said reclining device enabling a pivot motion between said sitting portion and said back portion, said right and left outer side members having one or more recliner attachment holes to receive said reclining device, said recliner attachment holes being symmetrical about said centerline such that said right outer side member can be used as said left outer side member and said left outer side member can be used as said right outer side member.

12. The motor vehicle seat of claim 10, wherein the right outer side and left outer side members each having a pair of spaced apart flanges, said flanges extending along opposing outsides edges of said side members and being generally parallel and symmetrical to said longitudinal centerline, said flanges also having a plurality of backboard attachment holes such that said right outer side member can be used as said left outer side member and said left outer side member can be used as said right outer side member.

13. A motor vehicle 60/40 seat comprising:
a narrow portion, a wide portion, said wide seat portion having a center seat portion and a side seat portion, said side seat portion having a sitting portion and a back portion, said back portion having an outer side member and an inner side member with a back crossbar member attached to and extending therebetween, said inner side member attached to said center seat portion;
said inner and outer side members each having a longitudinal centerline and a pair of crossbar attachment holes offset from and located on opposite sides of the center line, the inner and outer side members being symmetrical about said longitudinal centerline such that said outer side member can be used as said inner side member and said inner side member can be used as said outer side member with said back crossbar member directly attached to one of the pair of crossbar attachment holes.

* * * * *